United States Patent
Britt, Jr.

(10) Patent No.: US 10,774,962 B2
(45) Date of Patent: Sep. 15, 2020

(54) O-RING SEAL SYSTEM FOR METAL, THERMOPLASTIC AND FIBER REINFORCED PLASTIC FLANGES

(71) Applicant: BRITT ENGINEERING ASSOCIATES, INC., Birmingham, AL (US)

(72) Inventor: William F. Britt, Jr., Birmingham, AL (US)

(73) Assignee: BRITT ENGINEERING ASSOCIATES, INC., Birmingham, AL (US)

( * ) Notice: Subject to any disclaimer, the term of this patent is extended or adjusted under 35 U.S.C. 154(b) by 250 days.

(21) Appl. No.: 15/525,805

(22) PCT Filed: Nov. 17, 2015

(86) PCT No.: PCT/US2015/061027
§ 371 (c)(1),
(2) Date: May 10, 2017

(87) PCT Pub. No.: WO2016/081428
PCT Pub. Date: May 26, 2016

(65) Prior Publication Data
US 2017/0363234 A1    Dec. 21, 2017

Related U.S. Application Data

(60) Provisional application No. 62/081,231, filed on Nov. 18, 2014.

(51) Int. Cl.
*F16L 23/18* (2006.01)
*F16L 17/067* (2006.01)
(Continued)

(52) U.S. Cl.
CPC ............ *F16L 23/18* (2013.01); *F16J 15/127* (2013.01); *F16L 17/067* (2013.01); *F16L 47/14* (2013.01)

(58) Field of Classification Search
CPC . F16L 23/18; F16L 23/02; F16L 17/06; F16L 17/067
(Continued)

(56) References Cited

U.S. PATENT DOCUMENTS

| 1,859,065 | A | * | 5/1932 | Anderson | F16L 17/063 |
| | | | | | 277/608 |
| 2,104,799 | A | * | 1/1938 | Evans | F16L 17/10 |
| | | | | | 277/605 |
| 2,914,350 | A | * | 11/1959 | Smith | F16L 23/18 |
| | | | | | 277/639 |

(Continued)

FOREIGN PATENT DOCUMENTS

DE    1016080 B  *  9/1957  ............ F16L 17/06

*Primary Examiner* — David Bochna (57) ABSTRACT

An O-ring seal system for pipe flanges having a backing ring, an O-ring seal positioned within the backing ring, and a vacuum ring positioned within the O-ring seal. The backing ring and the vacuum ring form a rigid base against which mating flanges on pipes can be bolted together, thereby preventing bending of the mating flanges and permitting flange bolts to be torqued to their full tensile load limit without damage to the mating flanges. The O-ring seal system is constructed so that the O-ring seal is retained between the mating flanges without the need to position the O-ring seal in a groove in one of the mating flanges. Bending of the flanges is minimized since the flanges are clamped against the backing ring, minimizing stresses due to bending, thereby extending the service life of the flanges.

17 Claims, 6 Drawing Sheets

(51) Int. Cl.
*F16L 47/14* (2006.01)
*F16J 15/12* (2006.01)

(58) Field of Classification Search
USPC .................................. 285/368, 106, 100
See application file for complete search history.

(56) References Cited

U.S. PATENT DOCUMENTS

| | | | | |
|---|---|---|---|---|
| 2,967,727 | A * | 1/1961 | Wills | F16L 23/18 277/645 |
| 3,167,322 | A * | 1/1965 | Aichroth | F16J 15/127 277/453 |
| 3,531,133 | A * | 9/1970 | Gulick | F16L 23/18 277/611 |
| 3,573,870 | A * | 4/1971 | Gastineau | F16L 17/08 269/287 |
| 3,704,021 | A * | 11/1972 | Barbarin | F16L 23/18 277/611 |
| 3,892,416 | A * | 7/1975 | Ruhe | F16L 23/18 277/611 |
| 4,155,571 | A * | 5/1979 | Gastineau | F16L 17/08 277/609 |
| 6,299,216 | B1 * | 10/2001 | Thompson | F16L 23/167 285/93 |
| 6,402,159 | B1 * | 6/2002 | Kohn | F16L 23/18 277/608 |
| 6,708,984 | B1 * | 3/2004 | North | F16L 23/18 277/608 |
| 7,520,511 | B2 * | 4/2009 | Mori | F16L 17/06 277/611 |
| 7,540,502 | B1 * | 6/2009 | Rothgeb | F16L 23/20 277/606 |
| 7,722,053 | B2 * | 5/2010 | Hanashima | F16L 23/18 277/611 |
| 10,203,054 | B2 * | 2/2019 | Seeley | F16L 23/10 |
| 2009/0115139 | A1 * | 5/2009 | Jenkins | F16L 23/18 277/610 |
| 2010/0013220 | A1 * | 1/2010 | Rao | F16L 23/18 285/368 |
| 2012/0235365 | A1 * | 9/2012 | Stubblefield | F16L 23/18 277/644 |
| 2013/0313788 | A1 * | 11/2013 | Carvalho Veiga | F16L 23/18 277/610 |
| 2016/0138172 | A1 * | 5/2016 | Al-Buraiki | F16L 23/18 204/196.15 |
| 2017/0130881 | A1 * | 5/2017 | Edwards | F16L 23/18 |

\* cited by examiner

O-RING SEAL SYSTEM FOR METAL, THERMOPLASTIC AND FIBER REINFORCED PLASTIC FLANGES

The present application claims priority to U.S. Provisional Patent Application No. 62/081,231, filed Nov. 18, 2014, the disclosure of which is incorporated herein by reference.

TECHNICAL FIELD

The present invention relates to piping systems and more particularly to an O-ring flange sealing device that can be used to provide a full seal without the need to cut a groove in the flange.

BACKGROUND ART

Piping systems of various types have been developed for transmitting fluids from one place to another. A challenge in using piping systems is connecting pipe sections and other components to avoid leakage at the joint between component parts or sections of pipe. Flanges have been developed to address this problem, and are now commonly used to connect sections of piping and to accommodate piping components such as valves, flow meters, branch connections and connections to tanks or pumps. Flanges are fabricated from a variety of materials including metals, thermoplastics, and fiber-reinforced plastic (FRP). All pipe flanges, whether metallic or plastic, are susceptible to two failure mechanisms: compromised strength and leakage. FRP flanges are much more flexible than metal flanges since they are fabricated from anisotropic materials and, as such, are more susceptible to bending and cracking forces which manifest as soon as the flange bolts are tightened, and increase thereafter when the piping system is subjected to internal pressure.

Because of the susceptibility of flanges to leak or fail, many piping standards recommend minimizing the number of flange connections. Despite the concerns and limitation of flanges, flanges are the only means for connecting piping to components such as valves, flow meters, pumps, instruments, and tanks and, as such, are very important in efficient operation of the system. Current standards for FRP flanges are based on metallic flange standards. This requires FRP flanges to match metal flange standards in bolt patterns and flange dimensions. Due to the lower modulus of elasticity of FRP, sealing is more difficult because of flange bending and the possibility of cracking when soft gaskets are used. Other code standards are similarly deficient regarding FRP flanges; for example, the fiberglass pipe design codes lack reliable design guidelines for flanges.

Figure 1A:
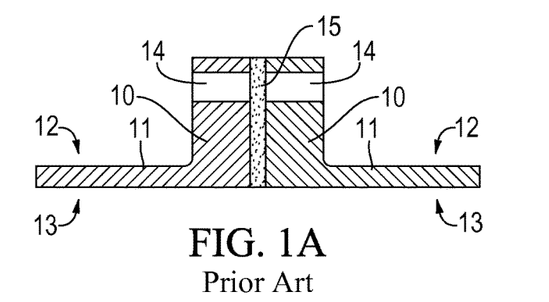
FIG. 1A shows a sectional view of two pipes, each with a flange, and a flat gasket seal in-between the flanges.
Figure 1B:
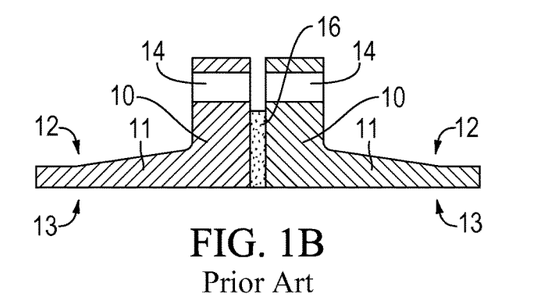
FIG. 1B shows a sectional view of two pipes, each with a flange, and a ring gasket seal in-between the flanges.

The problem of leakage at flange joints has been addressed by adapting various kinds of gaskets or seals that create a more or less static seal between adjacent flanges (or other components). For example, a commonly used gasket is the standard flat gasket seal shown in FIG. 1A. FIG. 1A shows a sectional view of two flanges 10 on pipes 11 with a flat gasket seal 15 between the two flanges 10. Also shown are the exteriors 12 and interiors 13 of the pipes 11. At the top of the flanges 10 are bolt holes 14. Soft flat gaskets are universally specified and are the standard for FRP flanges. Soft gaskets are generally made of rubber or soft elastomeric material that will compress to seal irregularities in the mating FRP surfaces. Such gaskets are positioned to cover the full face of the flange. Mating flanges are joined by bolting together at a torque calculated to properly seat the gaskets while limiting extrusion of the gasket from the interface. Soft gaskets normally require a low unit compression to achieve a leak-tight seal. However, the bolt loading must be adequate to prevent the flanges from bending under operating pressure of the piping system. Another commonly used gasket, shown in a sectional view in FIG. 1B, is a ring gasket 16.

Rubber gasket specifications are provided in ASTM D 1330 standard. If a gasket material is harder than the FRP flange material, the mating surfaces can be damaged possibly resulting in leakage. Hence, there is a need for soft gasket materials. PS 15-69 Voluntary Product Standard recommends a gasket material with durometer shore A or shore A2 hardness of 40 to 70 (70 being harder than 40). This standard, although originally intended for contact molded flanges, is widely used for the design of other types of FRP flanges.

The initial gasket preload is provided by the tensile load in the bolts, which is commonly known as the seating stress. Seating causes the gasket to deform and fill the irregularities on the flange surfaces to ensure contact over the sealing surface. As internal pressure is applied the gasket preload decreases and its ability to seal is reduced. The pressure load induces bending in the flange face and further reduces the sealing capability. If higher initial bolt loads are applied to overcome the pressure load on the flange, bending of the flange increases and tends to promote extrusion of the gasket.

Figure 1C:
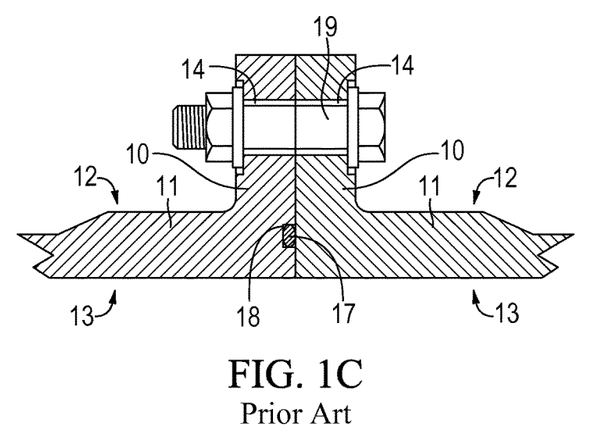
FIG. 1C shows a sectional view of two pipes, each with a flange, and an O-ring gasket seal in a groove in one of the flanges.
Figure 2:
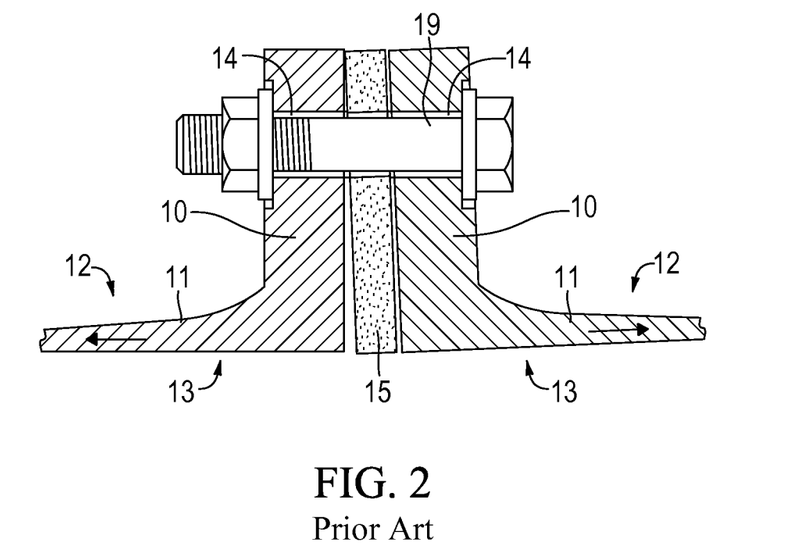
FIG. 2 shows a sectional view of two pipes, each with a flange, and a flat gasket seal in-between the flanges, wherein the flanges are shown separated due to pressure which produces gaps between the gasket and the flanges.

To overcome some of the negative effects associated with soft flat gaskets, such as the effects of pressure and loss of contact pressure, O-ring gaskets or seals have been developed. FIG. 1C shows, in a sectional view, an example of an O-ring gasket 17. O-ring gaskets are effective in sealing all types of flanges and have been very successful when used on metal flanges. O-ring seals require a close tolerance groove 18 to be machined in one of the flange faces to retain the seal and provide controlled compression of the seal. The groove must be machined to a controlled depth to ensure adequate preload of the seal when the flanges are mated and bolts are tightened to the design load. FIG. 1C also shows a bolt 19 in place in bolt holes 14. FIG. 2 depicts one of the problems encountered with prior art devices, flange bending that results from the force of pressure (indicated by the arrows) resulting in a partial separation or gapping of gasket 15 from flanges 10.

Figure 3A:
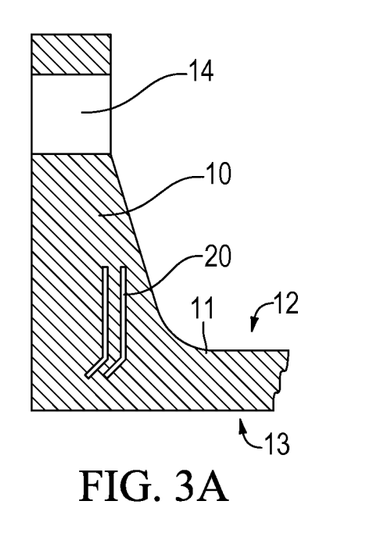
FIG. 3A shows, in a sectional view, an example of horizontal cracks in a flange.
Figure 3B:
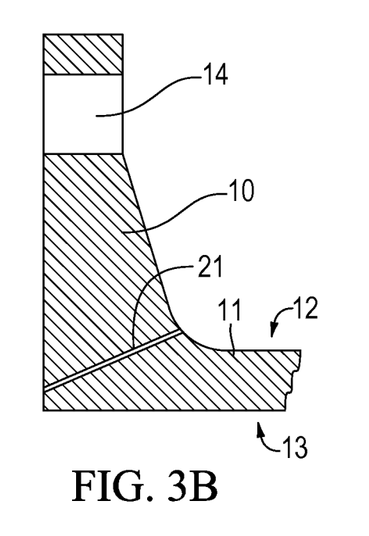
FIG. 3B shows, in a sectional view, an example of a diagonal crack in a flange.

While the standard O-ring design has proven to be very successful against leakage, the machined groove produces increased stress at the point of highest flange stress, namely, at the hub-flange interface. As a result, cracking of the flange hub has been observed when the piping system is subjected to pressure and/or bending stresses. Cracking of this type leads to leakage and eventual flange failure. FIG. 3A shows, in a sectional view, an example of horizontal cracks 20 in a flange 10. FIG. 3B shows, in a sectional view, an example of diagonal cracks 21 in a flange 10.

Additional problems arising with O-ring grooves relate to the requirement for a corrosion barrier. Corrosion barriers consist of a resin-rich layer of glass or polyester veil and two layers of chopped strand mat which protect the structural layers of pipe and flange from chemical attack. Corrosion barriers are placed on the face of each flange. When an O-ring groove is cut through the corrosion barrier the grooved area becomes susceptible to chemical attack. This requires replacement of the corrosion barrier which in turn changes the O-ring groove dimensions. To compensate for this change the groove dimensions must accommodate the barrier thickness. Such accommodations add to the cost of machining the groove and the overall cost of the flange.

There remains a need for an improved O-ring design for use with FRP and thermoplastic flanges.

DISCLOSURE OF THE INVENTION

The present invention is an O-ring seal system for pipe flanges. The O-ring seal system has a backing ring, an O-ring seal positioned within the backing ring, and a vacuum ring positioned within the O-ring seal. The backing ring and the vacuum ring form a rigid base against which mating flanges on pipes can be bolted together, thereby preventing bending of the mating flanges and permitting flange bolts to be torqued to their full tensile load limit without damage to the mating flanges. The O-ring seal system is constructed so that the O-ring seal is retained between the mating flanges without the need to position the O-ring seal in a groove in one of the mating flanges. The vacuum ring is constructed to prevent the O-ring seal from being displaced or pulled out of the mating flanges when a vacuum condition occurs in the pipes. The O-ring seal is constructed to provide a single point of line contact (see, e.g., 34) with the mating flanges on pipes so that slight flange waviness or lack of flatness in the mating flanges will not result in leakage. The backing ring thickness is constructed to compress the O-ring seal to an optimum sealing stress without over stressing the O-ring seal.

An advantage of the present invention is a full face metal ring used to back the O-ring seal which is an improvement in sealing FRP flanges and allows the use of a standard O-ring in any FRP, thermoplastic, or metal flange.

Another advantage is a metal backing ring which allows maximum bolt torque to be applied without the danger of overstressing the flange. Thus, flanges can be rated to the full pressure rating of the pipe without leakage and without damage to the flange.

Another advantage is that the O-ring seal can be applied without the need to machine a groove in the flange.

Another advantage is minimized bending of the flanges since the flanges are clamped against the backing ring, minimizing stresses due to bending, thereby extending the service life of the flanges.

Another advantage is that, since machining a groove into the flange is not required, a corrosion barrier remains intact, eliminating the need for rework.

Another advantage is that, since the O-ring seal provides a single point of line contact with the flange, slight flange waviness or lack of flatness will not result in leakage.

Another advantage is that, since the flanges are clamped to a solid backing ring, the flanges remain sealed even when subjected to dynamic conditions imposed by water hammer, pressure surges caused by pump start up or pump run down, or by piping system forces imposed by seismic or external impact forces.

Another advantage is that, since the flanges are clamped to a solid backing ring any bending stresses that are imposed by unsupported sections of the piping system will not affect the O-ring seal.

BEST MODES FOR CARRYING OUT THE INVENTION

While the following description details preferred embodiments of the present invention, and other aspects thereof, it is to be understood that the invention is not limited to the details of construction and arrangement of the parts illustrated in the accompanying drawings and description, since the invention is capable of other embodiments and of being practiced in various ways.

The present invention provides a novel O-ring seal that produces a leak-free operation throughout the maximum operating stress range for FRP and plastic flange and piping systems without the need to machine a groove into the flange. The invention also provides a novel O-ring seal device having excellent sealing capacity, without overstressing the flanges to which it is attached and without the need to machine a groove into the flange face. Standard flat gaskets must be discarded and replaced with a new gasket whenever a flange is opened. Unlike the standard flat gasket, an O-ring seal device of this invention can be reused many times. The unique O-ring seal system places an O-ring between a backing ring gasket and a vacuum ring gasket.

The O-ring seal system includes a solid ring plate that provides a backing face for the O-ring. The device further includes an inner ring that is fitted against the inner diameter of the O-ring. The inner ring of the device prevents suction of the O-ring into the pipe under vacuum conditions that can occur, for example, during operation or shut down of a fluid piping system. The O-ring seal system provides several benefits including the capability of connecting flanges with a reliable seal without applying a bending force on the flanges.

Certain variations of the invention described herein provide a number of benefits including reduced cost, improved flange performance, and increased longevity. For example, the high cost of machining a precision groove in the flange is eliminated. In addition, since a flat gasket is not required, relaxation due to creep is also eliminated. The O-ring seal system allows bolts to be initially tightened to the full bolt rating without overstressing the flange. This achieves a leak-free connection over the full pressure range of the pipe without causing the bending that leads to cracking.

When flat gaskets are used, bolt torques must be carefully specified to provide sufficient sealing pressure. Bolt torques are critical for sealing flanges and are affected by many factors, such as type of gasket, length and type of bolts, flange elastic modulus and rigidity, temperature, lubricity of bolts, etc. All soft gaskets creep after they have been loaded. Gasket creep is the tendency for the material to continue plastic deformation with no increase in load. Creep relaxation is greater at elevated temperatures, and since most piping systems operate with a fluid temperature that is higher than the ambient temperature at installation, creep due to increased temperature is of concern. It has been noted that 90% of creep takes place in the first 24 hours at operating temperature. Creep results in reduced bolt load, making retightening of bolts after start-up mandatory to assure that proper bolt torques are maintained. System pressure must be relieved prior to re-torqueing the bolts and re-torqueing should be done in approximately 10 ft-lb increments using the cross-torque method until the leak is stopped.

Current gasket design calculations for bolted joints such as ASME VIII, DIN 2505, etc., have multiple shortcomings related to the expected tightness and optimum operating stress levels to eliminate joint leakage. In general, current design methods only ensure that the optimal bolt load is available to seal the gasket and accommodate the hydraulic loads created by internal pressure. The tightness of the joint in service or the optimum level of gasket stress to ensure a leak-free connection over the operating spectrum of the piping system represents a noteworthy gap in current information. For example, the ASME B 31.3 code for flanges offers a detailed method of design but fails to take into account the bending caused by the relaxation of the soft gasket and loss of bolt torque as the gasket continues to creep under load.

Figure 4:
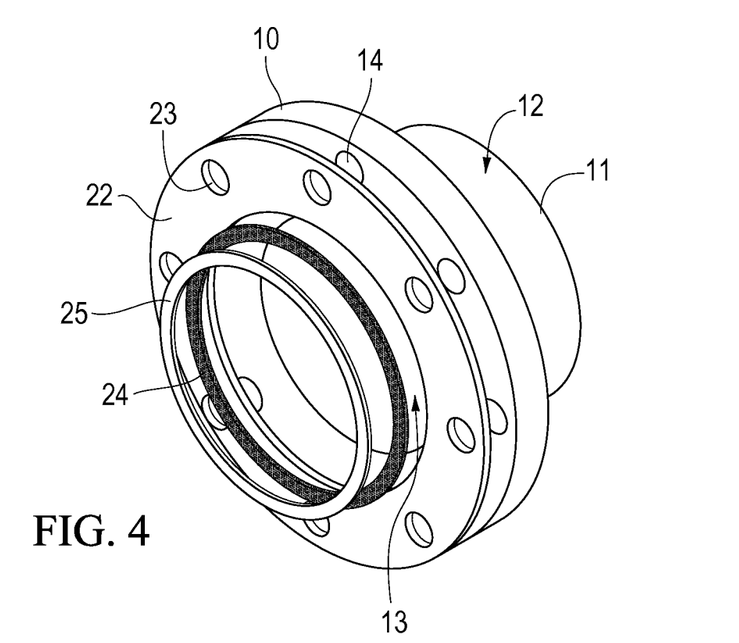
FIG. 4 shows a front, right, perspective exploded view of the O-ring seal assembly of the present invention.
Figure 5:
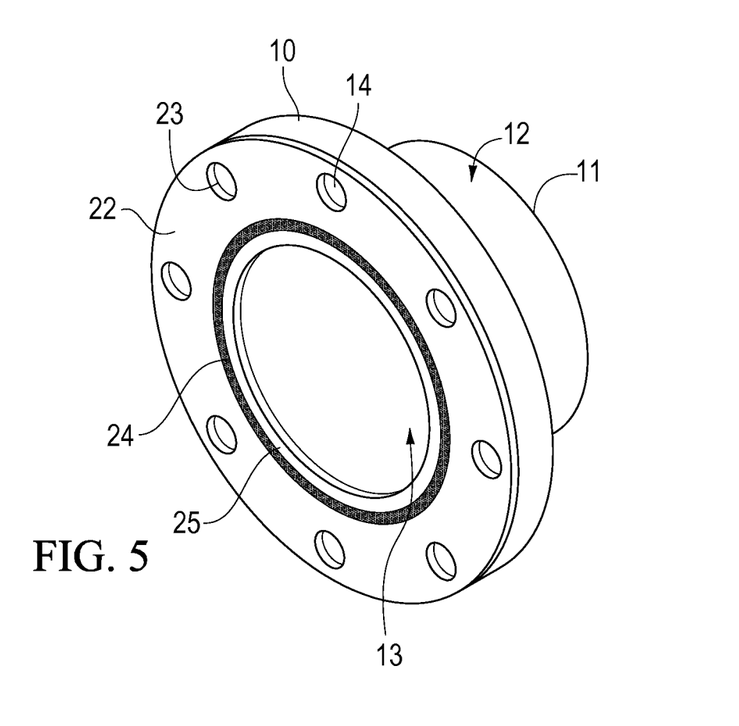
FIG. 5 shows a front, right, perspective assembled view of the O-ring seal assembly of the present invention.
Figure 6:
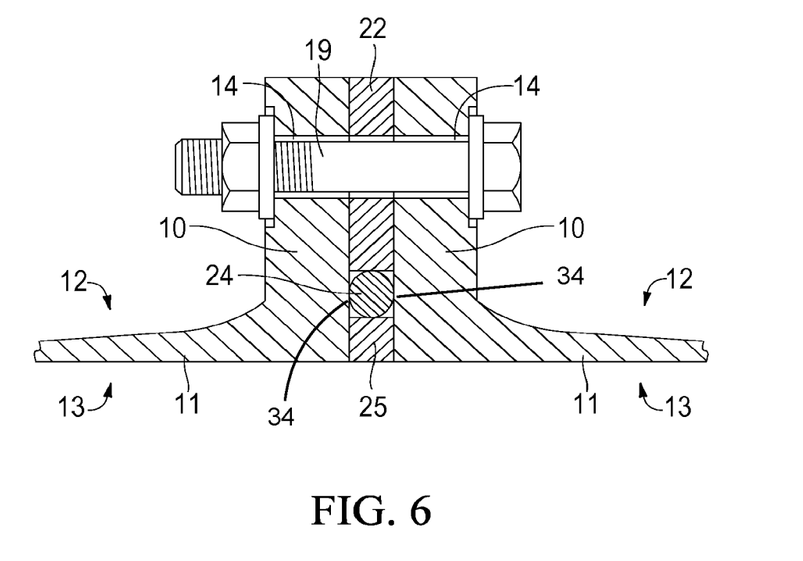
FIG. 6 shows a sectional view of two pipes, each with a flange, and the O-ring seal assembly in-between the flanges.
Figure 7A:
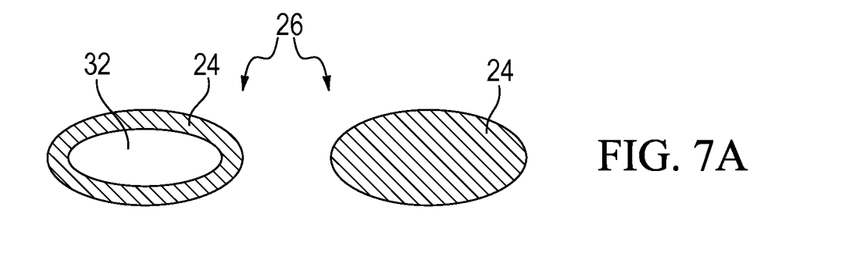
FIGS. 7A-7E show various shapes of hollow and solid O-ring seals.
Figure 7B:
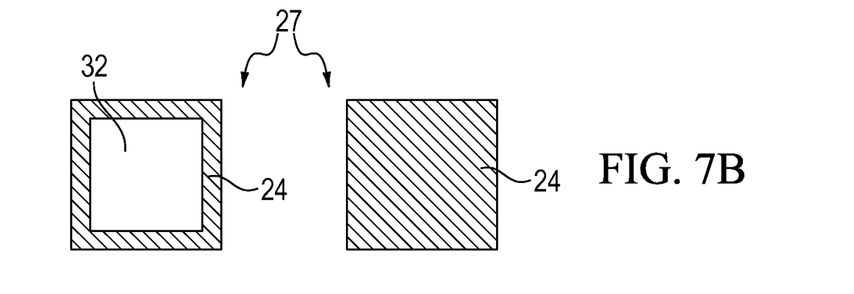
Figure 7C:
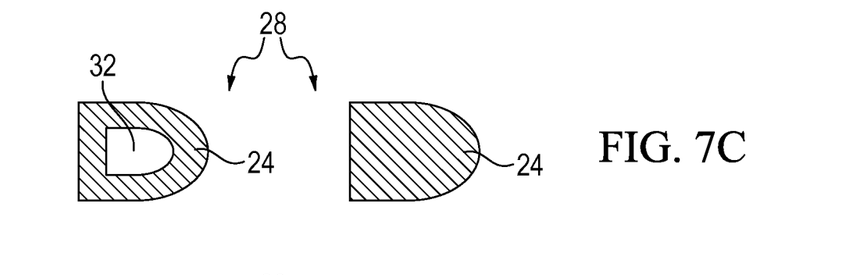
Figure 7D:
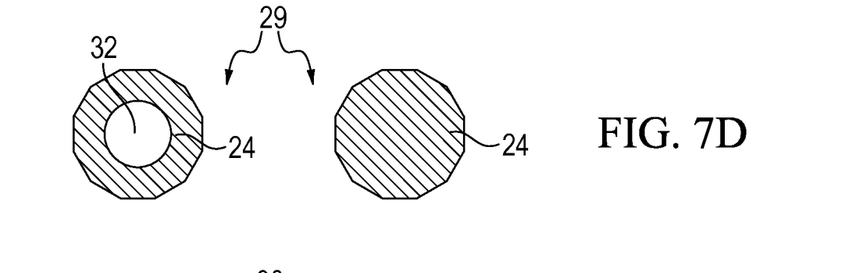
Figure 7E:
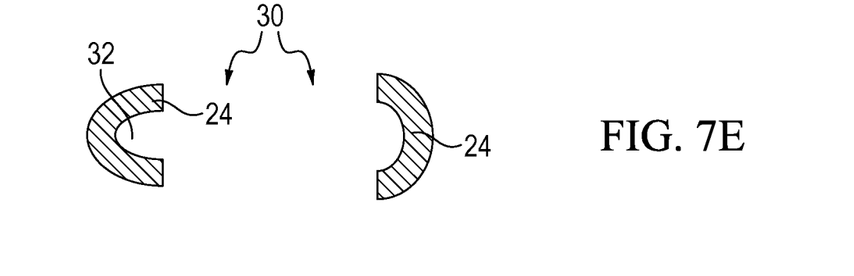

FIG. 4 shows a front, right, perspective exploded view of the O-ring seal system of the present invention. Flange 10 is attached to pipe 11. A backing ring 22 is positioned on the end face of the flange 10. The backing ring 22 has bolt holes 23 which align with the bolt holes 14 of the flange 10. An O-ring seal 24 is positioned within the backing ring 22. A vacuum ring 25 is positioned within the O-ring seal 24. The exterior 12 and the interior 13 of the pipe 11 are shown. FIG. 5 shows a front, right, perspective assembled view of the O-ring seal system of the present invention. FIG. 6 shows a sectional view of two pipes 11, each with a flange 10, and the O-ring seal system in-between the flanges. The O-ring seal system comprises a backing ring 22, an O-ring seal 24, and vacuum ring 25.

FIGS. 7A-7E show in cross section various shapes of hollow and solid O-ring seals 24. Besides being circular, the O-ring seals can be oval 26, rectangular 27, D-shaped 28, polygon-shaped 29, or C-shaped 30. The hollow O-ring seals have a hollow interior 32.

Figure 8:
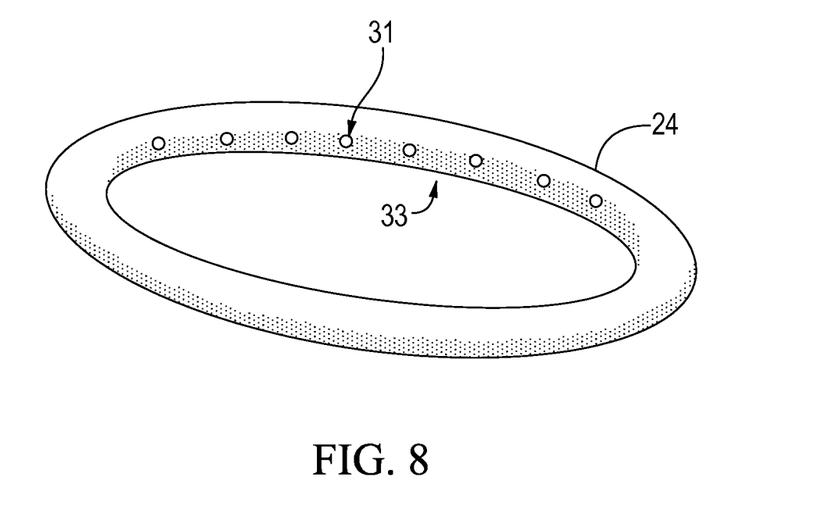
FIG. 8 shows a perspective view of an O-ring seal with vents.
Figure 9:
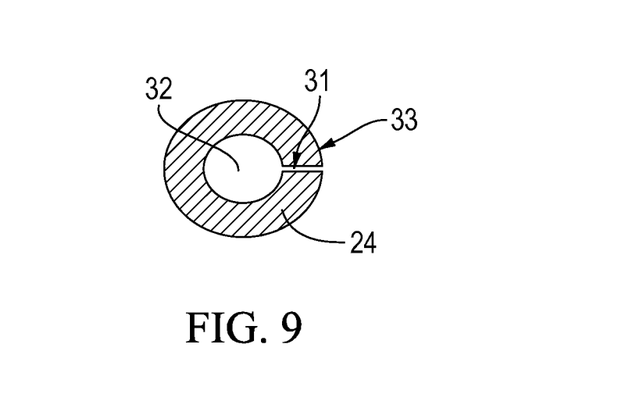
FIG. 9 shows a sectional view of an O-ring seal with vents.

FIG. 8 shows a perspective view of an O-ring seal 24 with vents 31 along an inner circumference 33. FIG. 9 shows a sectional view of an O-ring seal 24 with vents 31 extending from the hollow interior 32 to the inner circumference 33. The vent 31 is a small circular hole that is located on the inner circumference 33 of the O-ring seal 24. The vent 31 may be a singular hole or multiple holes spaced along the inner circumference 33 of the O-ring seal 24. The vent 31 allows fluid pressure to assist the sealing force of the O-ring seal 24 to increase the sealing pressure against the backing ring 22 and flange surfaces. Although the vents 31 are shown only in an O-ring seal with a circular shaped configuration they can also be formed in the other configurations shown in FIGS. 7A-7E. Materials of construction for the O-ring seal include elastomeric polymer materials such as rubber, plastic and thermoplastic materials that can be formed and joined to form a circular O-ring seal or to form O-ring seals in the configurations shown in FIGS. 7A-7E.

The O-ring seal 24 is activated by system pressure that is applied to the inside radius of O-ring seal 24. The internal pressure forces the O-ring seal 24 in an outward direction against backing ring 22 where the O-ring seal 24 seals the edges of the backing ring 22.

Backing ring 22 and vacuum ring 25 are, preferably, fabricated from metal, but plastic or other suitably rigid material can be used. The backing ring 22 and vacuum ring 25 form a rigid base against which the two mating flanges 10 can be clamped. This rigid base prevents bending of the flanges 10 and permits the bolts 19 to be torqued to their full tensile load limit without damage to the flanges 10. The thickness of backing ring 22 is constructed to compress the O-ring seal 24 to an optimum sealing stress without over stressing the O-ring seal 24.

The vacuum ring 25 prevents the O-ring seal 24 from being displaced or pulled into the pipe interior 13 in the event that a vacuum condition occurs, for example during a shutdown of the system. When system pressure is restored the O-ring seal remains in place to seal the internal pressure within the interior 13 of pipe 11.

The unique design of the O-ring seal system provides a positive, leak-free seal over the entire operating range of the FRP flange and pipe since the solid backing ring 22 allows flange bolts 14 to be torqued to the maximum rated value for the bolts without damage to the FRP flanges. Moreover, bending of the flanges is minimized or eliminated thereby preventing flange cracking.

The O-ring seal system is extremely reliable when the O-ring system is constructed as described above. For example, the initial seal pressure will ensure that the O-ring seal 24 will be activated when system pressure is applied, and that the O-ring seal 24 is contained to prevent extrusion or blow out of the O-ring seal 24. The O-ring seal system can be used with any flat-faced flanges.

Flat gaskets require differing amounts of compression to affect a seal. However, the O-ring seal of the present invention does not have this requirement because metal to metal contact of the backing ring and the vacuum ring controls and limits the compression or sealing pressure. The backing ring thickness is designed to control and limit the O-ring seal compression. The O-ring seal system is intended for use in static seal applications where the flange mating surfaces are not subject to relative movement, except for movements due to thermal expansion or deflection by fluid pressure. The O-ring size, material compound, hardness, and backing ring material and thickness are a function of the pipe size, operating pressure, type of contained fluid, and operating temperature range. The prime design requirement for static seals is proper compression and resistance to compression set.

Manufacturers of O-rings have developed a wide range of materials that can provide excellent corrosion resistance for most process chemicals, as well as maintain mechanical properties to affect sealing over the range of temperatures of process piping systems. The O-ring seal of the present invention can be used in all the applications where such materials can be selected. As would be known to the skilled artisan, any suitable material can be used for the O-ring seal for sealing flanges.

Example

Several hydrostatic tests were conducted using two flange-by-flange spools by methods well known in the art.

The pipe used was a 6-inch diameter filament wound pipe rated at 150 psi. The rating is based on a 10:1 factor of safety with a design burst of 1500 psi. O-ring seals of the present invention were used to connect the spools and end closures. The bolts in the flanges were tightened to the maximum specified torque for the flange bolts. The test spool was then allowed to stand for 24 hours without additional tightening to ensure flange tightness was not affected by relaxation.

A hydrostatic pressure of 100 psi was applied to the test system and held for 15 minutes. Each seal was checked to verify no leakage. Thereafter, the pressure was increased in 100 psi increments and held at each step to check for leakage. At a pressure of 2200 psi there was dramatic failure in the pipe joint connecting the flange to the pipe section at the end closure.

The results of these tests showed no seal leakage throughout the incremental pressure rise up to the point that the pipes experienced a structural failure. Pipe structural failure occurred at a much higher pressure than expected based on the pipe rating, and at a much higher pressure than comparable tests using standard elastomeric gaskets. The flanges used in these tests did not require re-torqueing, and the seals were reused after the flanges were opened for inspection.

While this invention has been described in some detail with reference to specific exemplary embodiments, there is no intention that the invention be limited to such detail. On the contrary, the invention is intended to include any alternative or equivalent embodiments that fall within the spirit and scope of the invention as described and claimed herein.

The invention claimed is:

1. An O-ring seal system for plastic pipe flanges, comprising:
   a) a backing ring having openings therein to receive bolts therethrough;
   b) an elastomeric O-ring seal positioned within said backing ring, said elastomeric O-ring seal having a hollow interior and one or more vents extending from said hollow interior to an inner circumference of said elastomeric O-ring seal;
   c) a vacuum ring positioned within said elastomeric O-ring seal;
   d) said backing ring and said vacuum ring forming a rigid base against which mating plastic pipe flanges on pipes can be bolted together, thereby preventing bending of said mating plastic pipe flanges and permitting flange bolts to be torqued to their full tensile load limit without damage to said mating plastic pipe flanges; and
   e) said O-ring seal system being constructed so that said elastomeric O-ring seal is retained between said mating plastic pipe flanges without the need to position said elastomeric O-ring seal in a groove in one of said mating plastic pipe flanges.

2. The O-ring seal system of claim 1 wherein said backing ring has a thickness constructed to compress said elastomeric O-ring seal to an optimum sealing stress without over stressing said elastomeric O-ring seal.

3. The O-ring seal system of claim 1 wherein said vacuum ring is constructed to prevent said elastomeric O-ring seal from being displaced or pulled out of said mating plastic pipe flanges when a vacuum condition occurs in said pipes.

4. The O-ring seal system of claim 1 wherein said elastomeric O-ring seal is constructed to provide a single point of line contact with said mating plastic pipe flanges so that slight flange waviness or lack of flatness in said mating plastic pipe flanges will not result in leakage.

5. The O-ring seal system of claim 1 wherein said elastomeric O-ring seal is circular, oval, rectangular, D-shaped, polygon-shaped, or C-shaped.

6. An O-ring seal system for plastic pipe flanges, comprising:
   a) a backing ring having openings therein to receive bolts therethrough;
   b) an elastomeric O-ring seal positioned within said backing ring, said elastomeric O-ring seal having a hollow interior and one or more vents extending from said hollow interior to an inner circumference of said elastomeric O-ring seal;
   c) a vacuum ring positioned within said elastomeric O-ring seal;
   d) said backing ring and said vacuum ring forming a rigid base against which mating plastic pipe flanges on pipes can be bolted together, thereby preventing bending of said mating plastic pipe flanges and permitting flange bolts to be torqued to their full tensile load limit without damage to said mating plastic pipe flanges;
   e) said O-ring seal system being constructed so that said elastomeric O-ring seal is retained between said mating plastic pipe flanges without the need to position said elastomeric O-ring seal in a groove in one of said mating plastic pipe flanges;
   f) said vacuum ring constructed to prevent said elastomeric O-ring seal from being displaced or pulled out of said mating plastic pipe flanges when a vacuum condition occurs in said pipes; and
   g) said elastomeric O-ring seal constructed to provide a single point of line contact with said mating plastic pipe flanges so that slight flange waviness or lack of flatness in said mating plastic pipe flanges will not result in leakage.

7. The O-ring seal system of claim 6 wherein said backing ring has a thickness constructed to compress said elastomeric O-ring seal to an optimum sealing stress without over stressing said elastomeric O-ring seal.

8. The O-ring seal system of claim 7 wherein said elastomeric O-ring seal is circular, oval, polygon-shaped, or C-shaped.

9. A plastic pipe coupling, comprising:
   a) a first plastic pipe having a first flange;
   b) a second plastic pipe having a second flange, wherein said first flange and said second flange are coupled together such that said first plastic pipe is in fluid communication with said second plastic pipe;
   c) a backing ring positioned between said first flange and said second flange and having openings therein to receive bolts therethrough;
   d) an elastomeric O-ring seal positioned between said first flange and said second flange and within said backing ring; and
   e) a vacuum ring positioned between said first flange and said second flange and within said elastomeric O-ring seal.

10. The plastic pipe coupling of claim 9 wherein said backing ring and said vacuum ring form a rigid base between said first flange and said second flange, thereby preventing bending of said first flange or said second flange and permitting flange bolts to be torqued to their full tensile load limit without damage to said first flange or said second flange.

11. The plastic pipe coupling of claim 9 wherein said backing ring has a thickness constructed to compress said elastomeric O-ring seal to an optimum sealing stress without over stressing said elastomeric O-ring seal.

12. The plastic pipe coupling of claim 9 wherein said vacuum ring is constructed to prevent said elastomeric O-ring seal from being displaced from said plastic pipe coupling when a vacuum condition occurs in said first and second pipes.

13. The plastic pipe coupling of claim 9 wherein said pipe coupling is constructed so that said elastomeric O-ring seal is retained between said first flange and said second flange without the need to position said elastomeric O-ring seal in a groove in one of said flanges.

14. The plastic pipe coupling of claim 9 wherein said elastomeric O-ring seal is constructed to provide a single point of line contact with said first flange and said second flange so that slight flange waviness or lack of flatness in said first flange or said second flange will not result in leakage.

15. The plastic pipe coupling of claim 9 wherein said elastomeric O-ring seal is circular, oval, rectangular, D-shaped, polygon-shaped, or C-shaped.

16. The plastic pipe coupling of claim 9 wherein said elastomeric O-ring seal has a hollow interior.

17. The plastic pipe coupling of claim 16 wherein said elastomeric O-ring seal has one or more vents extending from said hollow interior to an inner circumference of said elastomeric O-ring seal.

\* \* \* \* \*